United States Patent
Raghavan et al.

(10) Patent No.: US 11,817,914 B2
(45) Date of Patent: Nov. 14, 2023

(54) PHASE RETRIEVAL USING SIGNAL STRENGTH MEASUREMENT PROXIES

(71) Applicant: QUALCOMM Incorporated, San Diego, CA (US)

(72) Inventors: Vasanthan Raghavan, West Windsor Township, NJ (US); Juergen Cezanne, Ocean Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 17/563,894

(22) Filed: Dec. 28, 2021

(65) Prior Publication Data

US 2023/0208535 A1 Jun. 29, 2023

(51) Int. Cl.
*H04B 17/12* (2015.01)
*H04B 17/318* (2015.01)
*H04B 7/06* (2006.01)
*H04B 7/01* (2006.01)

(52) U.S. Cl.
CPC ............. *H04B 17/12* (2015.01); *H04B 7/01* (2013.01); *H04B 7/0682* (2013.01); *H04B 17/318* (2015.01)

(58) Field of Classification Search
CPC ........ H04B 17/12; H04B 7/01; H04B 7/0682; H04B 17/318
USPC ........................................... 375/262
See application file for complete search history.

(56) References Cited

U.S. PATENT DOCUMENTS

2021/0119751 A1* 4/2021 Mundarath .......... H04L 1/0045
2022/0279535 A1* 9/2022 Tsui ...................... H04B 7/043

* cited by examiner

*Primary Examiner* — Fitwi Y Hailegiorgis
(74) *Attorney, Agent, or Firm* — Arun Swain (57) ABSTRACT

A network device is provided that uses power measurements to measure a relative phase between a received signal from a reference antenna in a plurality of antennas and a received signal from each antenna in the plurality of antennas except the reference antenna. The network device may use a direct phase measurement to measure the phase of other received signals from additional antennas.

27 Claims, 5 Drawing Sheets

```
┌─────────────────────────────────────────────────────────────────┐
│ receiving a plurality of reference signals at a plurality of     │
│ antennas to provide a plurality of received signals, each        │
│ received signal corresponding uniquely to an individual antenna  │
│ from the plurality of antennas                                   │
└─────────────────────────────────────────────────────────────────┘
                                                          500
                              │
                              ▼
┌─────────────────────────────────────────────────────────────────┐
│ measuring a power of each received signal in the plurality of    │
│ received signals to provide a plurality of individual received   │
│ signal power measurements                                        │
└─────────────────────────────────────────────────────────────────┘
                                                          505
                              │
                              ▼
┌─────────────────────────────────────────────────────────────────┐
│ selecting subsets of received signals from the plurality of      │
│ received signals, each subset of received signals including a    │
│ received signal from a reference antenna in the plurality of     │
│ antennas and at least one additional received signal             │
└─────────────────────────────────────────────────────────────────┘
                                                          510
                              │
                              ▼
┌─────────────────────────────────────────────────────────────────┐
│ measuring a power of each subset of received signals to provide  │
│ a plurality of multiple received signal power measurements       │
└─────────────────────────────────────────────────────────────────┘
                                                          515
                              │
                              ▼
┌─────────────────────────────────────────────────────────────────┐
│ measuring a power of each subset of received signals to provide  │
│ a plurality of multiple received signal power measurements       │
└─────────────────────────────────────────────────────────────────┘
                                                          520
```

FIG. 5

PHASE RETRIEVAL USING SIGNAL STRENGTH MEASUREMENT PROXIES

TECHNICAL FIELD

This application relates to wireless communication systems, and more particularly to the characterization of the phase relationship between antennas using signal strength measurement proxies.

INTRODUCTION

To meet the growing demands for expanded mobile broadband connectivity, wireless communication technologies have advanced from the long-term evolution (LTE) technology to a next generation new radio (NR) technology, which may also be referred to as $5^{th}$ Generation (5G). For example, NR is designed to provide a lower latency, a higher bandwidth/throughput, and a higher reliability than LTE. NR may operate over a wide array of spectrum bands, for example, from low-frequency bands below about 1 gigahertz (GHz) and mid-frequency bands from about 1 GHz to about 7.125 GHz, to high-frequency bands such as millimeter wave (mmWave) bands beyond 24.25 GHz.

The expansion to mid-frequency and high-frequency bands enhances the beamforming ability for an NR user equipment (UE). A UE may then steer a beam to be directed to a base station so as to increase the resulting signal-to-noise ratio for both received and transmitted signals. But accurate beamforming requires the UE to characterize the phase relationship across its antenna elements for the current channel state. Based upon the relative phase relationship, the UE may then adjust its beamforming weights accordingly. The direct characterization of the antenna phase relationships by a UE may require relatively expensive and complicated hardware, particularly for a UE with analog beamforming. In addition, the direct characterization of the antenna phase relationships typically requires an accurate calibration for the beamforming weights, which may depend upon antenna dimensions and thus may be time consuming. A direct characterization of the antenna phase relationships across multiple antenna panels may require circuit-level redesigns, which increases costs and production delay.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a network device is provided that includes: a transceiver including a plurality of antennas, the transceiver being configured to: process a plurality of received signals from the plurality of antennas to provide a series of individual received signals, each individual received signal being derived from a received signal from a respective antenna in the plurality of antennas, process the plurality of received signals to provide a series of sets of received signals, each set of received signals being derived from at least two corresponding received signals from respective antennas in the plurality of antennas, and measure a power of each individual received signal in the series of individual received signals and of each set of received signals in the series of sets of received signals to provide a plurality of power measurements, the network device further comprising: a processor configured to process the plurality of power measurements to determine a relative phase between the received signal from a reference antenna in the plurality of antennas and the received signal from each antenna in the plurality of antennas except the reference antenna to provide a plurality of relative phase measurements.

In another aspect of the disclosure, a first network device is provided that includes:
a transceiver including a plurality of antennas, and a processor configured to command the transceiver to transmit a series of reference signals according to a periodicity to a second network device for a series of relative phase measurements at the second network device.

In yet another aspect of the disclosure, a method of phase retrieval is provided that includes the acts of: receiving a plurality of reference signals at a plurality of antennas to provide a plurality of received signals, each received signal corresponding uniquely to an individual antenna from the plurality of antennas; measuring a power of each received signal in the plurality of received signals to provide a plurality of individual received signal power measurements; selecting subsets of received signals from the plurality of received signals, each subset of received signals including a received signal from a reference antenna in the plurality of antennas and at least one additional received signal; measuring a power of each subset of received signals to provide a plurality of multiple received signal power measurements; and determining a relative phase between the received signal from the reference antenna and each remaining received signal in the plurality of received signals based upon the plurality of individual received signal power measurements and the plurality of multiple received signal power measurements.

In yet another aspect of the disclosure, a network device is provided that includes: a transceiver including a plurality of antennas configured to provide a plurality of received signals, the transceiver being configured to: process a received signal from a selected antenna from the plurality of antennas or received signals from a selected subset of antennas from the plurality of antennas to provide a series of received signals, and measure a power of each received signal in the series of received signals to provide a plurality of power measurements, the network device further comprising a processor configured to process the plurality of power measurements to determine a relative phase between the received signal from a reference antenna in the plurality of antennas and the received signal from each antenna in the plurality of antennas except the reference antenna.

Other aspects, features, and implementations of the disclosure will become apparent to those of ordinary skill in the art, upon reviewing the following description of exemplary implementations in conjunction with the accompanying figures.

DETAILED DESCRIPTION

To mitigate the complexity and high cost of directly characterizing or determining the antenna phase relationship, an indirect characterization of the antenna phase relationships for the current channel state of a network device is disclosed. The characterization is deemed to be indirect because it uses signal strength measurements (which may also be denoted as second-order relationships) that function as proxies for a direct measurement of the antenna phase relationships (first-order relationships). To provide a better appreciation of this improved antenna phase relationship characterization, some background principles for NR will be reviewed initially, followed by a detailed discussion of the antenna phase relationship characterization. The various concepts presented throughout this disclosure may be implemented across a broad variety of telecommunication systems, network architectures, and communication standards.

Figure 1:
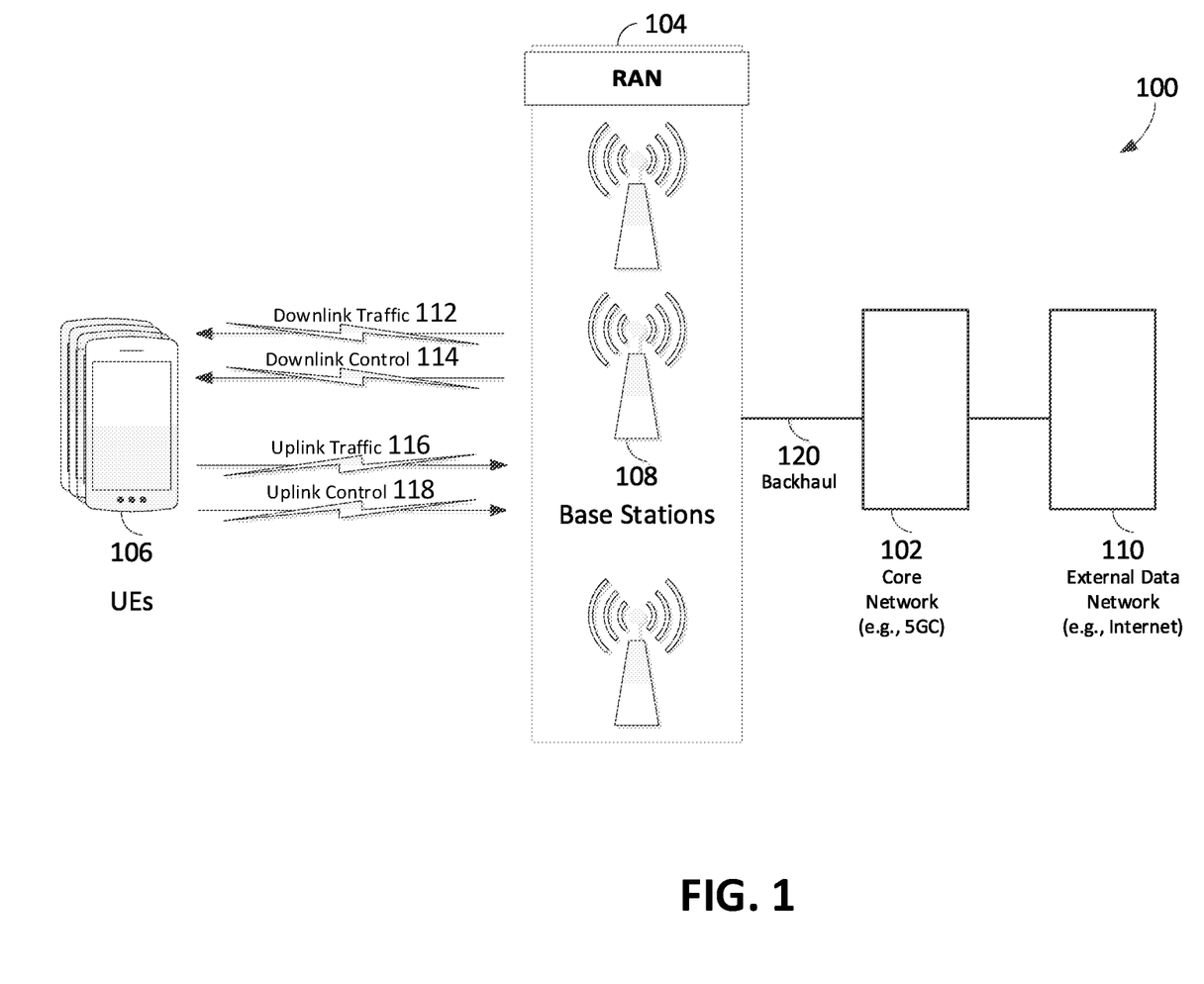
FIG. 1 is a schematic illustration of a wireless communication system with a phase retrieval by signal strength proxies in accordance with an aspect of the disclosure.

Referring now to FIG. 1, as an illustrative example, various aspects of the present disclosure are illustrated with reference to a wireless communication system 100. The wireless communication system 100 includes three interacting domains: a core network 102, a radio access network (RAN) 104, and a plurality of user equipments (UEs) 106. By virtue of the wireless communication system 100, each UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE 106. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be defined as an apparatus that provides a user with access to network services.

Within the present document, a "mobile" apparatus need not necessarily have a capability to move and may be stationary. The term mobile apparatus or mobile device broadly refers to a diverse array of devices and technologies. UEs 106 may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Tele-health devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station 108 to one or more UEs 106 may be referred to as downlink (DL) transmission. In accordance with certain aspects of the present disclosure, the term downlink may refer to a point-to-multipoint transmission originating at a base station 108. Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point or a point-to-multi-point transmission originating at a UE 106.

A base station 108 may thus broadcast downlink traffic 112 to one or more UEs 106. Broadly, the base station 108 is a node or device responsible for scheduling traffic in a wireless communication network, including the downlink traffic 112 and, in some examples, uplink traffic 116 and uplink control information 118 from the one or more UEs 106. On the other hand, each UE 106 is a node or device that receives downlink control information 114, including but not limited to scheduling information (e.g., a grant), synchronization or timing information, or other control information from another entity in the wireless communication network such as the base station 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

In various implementations, the air interface in the radio access network 104 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 104 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. The channel is dedicated for transmissions in one direction at a given time in TDD, while at other times the channel is dedicated for transmissions in another direction, where the direction may change very rapidly, e.g., several times per slot. With this background information in mind, aspects of the phase retrieval (the determination of the phase relationship between antennas for a current channel state) using signal strength measurement proxies will now be discussed in more detail. The phase retrieval will be discussed with respect to a user equipment, but it will be appreciated that any suitable network device may perform the phase retrieval discussed herein.

Referring again to wireless communication system 100, it may be assumed that a transmitting base station 108 transmits using a plurality of $N_t$ transmit antennas to form downlink traffic 112 or downlink control 114 whereas a receiving UE 106 receives the resulting downlink messages and commands with a plurality of $N_r$ receive antennas. In these downlink transmissions, the transmitting base station 108 may beamform a scalar symbol s according to a beamforming vector $f_{gNB}$ having a dimension $N_t$, where $N_t$ is again the number of transmitting antennas. The resulting signal then transmits over a channel characterized by an $N_r \times N_t$ channel matrix H to the receiving UE 106. If relatively high signal-to-noise ratio (SNR) conditions are assumed for the channel, the received signal at the UE (prior to any gain and phasing in the UE's receiver) may be represented by a vector h that equals a product $Hf_{gNB}$. The received signal vector h has a dimension $N_r$ such that h equals $[h_1, \ldots hN_r]$. Each receive antenna receives its own corresponding received signal as characterized by the respective value in the vector h. For example, a first receive antenna receives signal $h_1$ in the received signal vector $[h_1, \ldots, hN_r]$. A second receive antenna receives a signal $h_2$, and so on such that an $N_r$-th receive antenna receives signal $hN_r$ from the received signal vector h. Each antenna may instead be a subset of antennas in alternative implementations.

Each received signal has a phase and an amplitude. For example, the signal $h_1$ received by the first receive antenna has a phase represented as $\angle h_1$. Similarly, the signal $h_2$ received by the second receive antenna has a phase represented by $\angle h_2$, and so on such that the phase of the signal $hN_r$ received by the $N_r$-th receive antenna may be represented as $\angle hN_r$. The phase relationship between the received signals across the antennas need not be characterized absolutely. It thus suffices to characterize the relative phase between the received signals. The phase for the received signal from a reference one of the antennas may be arbitrarily set to zero in such a relative phase measurement. In the following discussion, it will be assumed that the phase of the received signal ($h_1$) for a first receive antenna is zero, but it will be appreciated that any of the $N_r$ receive antennas may be the arbitrarily-set-to-zero-phase receive antenna, which is also denoted as a reference receive antenna herein. The received signal from the reference receive antenna may also be denoted as the reference received signal.

A phase retrieval for the $N_r$ antennas may thus be completed by determining the relative phase between the reference received signal and the received signal from each of the remaining $(N_r-1)$ antennas. It is assumed herein that a network device configured for phase retrieval as discussed herein may individually control the gain and phase for the received signal from any given antenna. An example network device 200 with individual gain and phase control is shown in more detail in FIG. 2. Network device 200 may be a phase-retrieving network device (e.g., a UE) or a base station that transmits a series of reference signals for the phase retrieval at a remote network device. Network device 200 includes a processing system 214 having a bus interface 208, a bus 203, a memory 205, a processor 204, and a computer-readable medium 206. Furthermore, network device 200 may include a user interface 212 and a transceiver 201.

Figure 2:
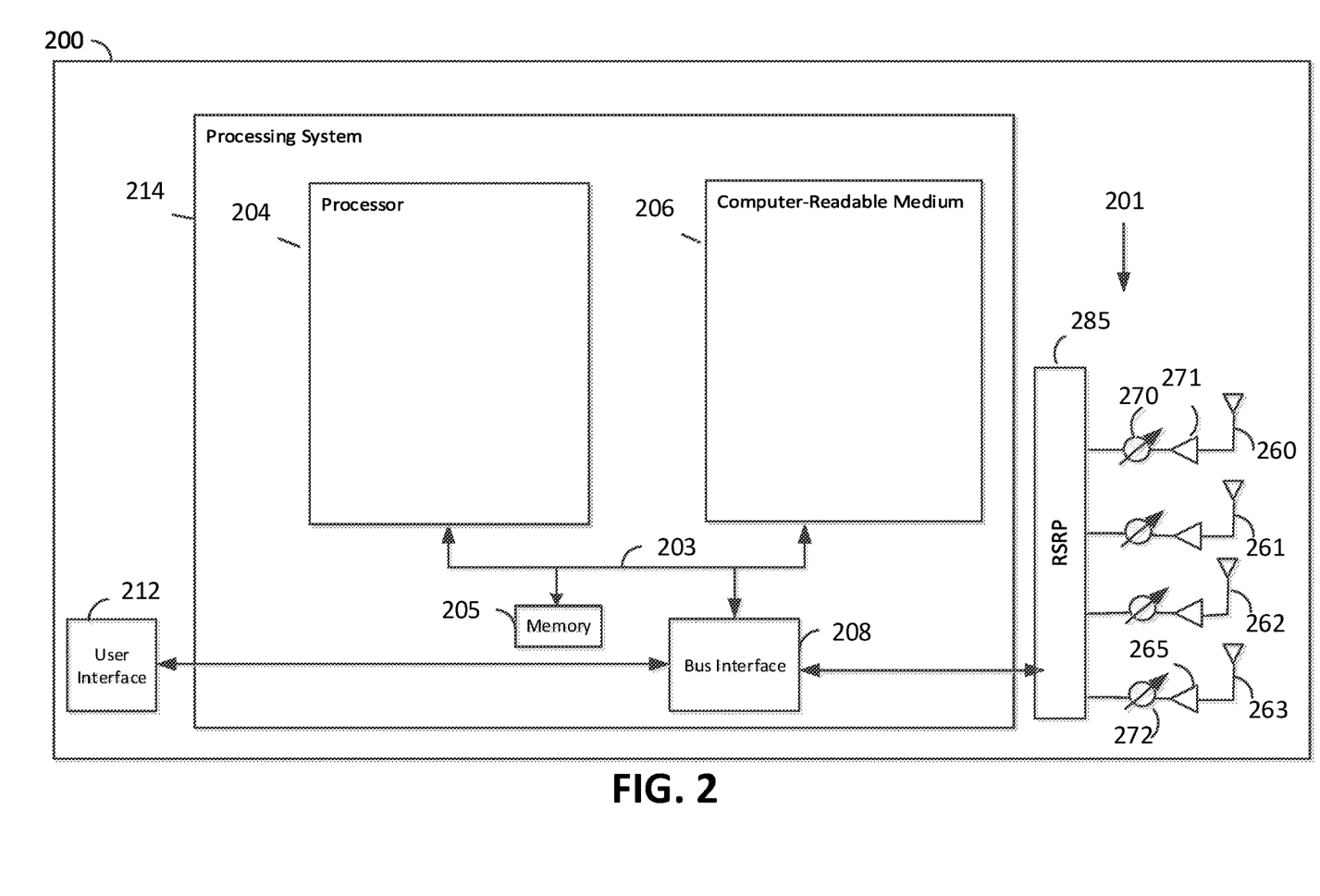
FIG. 2 illustrates an architecture for a network device configured for the phase retrieval in the system of FIG. 1 in accordance with an aspect of the disclosure.

Processor 204 is also responsible for managing the bus 203 and general processing, including the execution of software stored on the computer-readable medium 206. The software, when executed by the processor 204, causes the processor 204 to perform the phase retrieval calculations discussed further herein. The computer-readable medium 206 and the memory 205 may also be used for storing data that is manipulated by the processor 204 when executing software.

The bus 203 may include any number of interconnecting buses and bridges depending on the specific application of the processing system 214 and the overall design constraints. The bus 203 communicatively couples together various circuits including one or more processors (represented generally by the processor 204), the memory 205, and computer-readable media (represented generally by the computer-readable medium 206). The bus 203 may also link various other circuits such as timing sources, peripherals, voltage regulators, and power management circuits, which are well known in the art, and therefore, will not be described any further. The bus interface 208 provides an interface between the bus 203 and transceiver 201.

In transceiver 201, there are four receive antennas ($N_r=4$) including a first receive antenna 260, a second receive antenna 261, a third receive antenna 262, and a fourth receive antenna 263. Transceiver 201 may apply an individual gain to the received signal from each antenna (the corresponding element from the received signal vector h). This individual gain is represented by an amplifier for each antenna although it will be appreciated that a chain of amplifiers may be used to apply this individual gain. For example, a received signal $h_4$ from the fourth antenna 263 is amplified by an amplifier 265 according to a gain $g_4$. Similarly, an amplifier 271 amplifies received signal $h_1$ from first antenna 260 according to a gain gi. In this fashion, each received signal is amplified by a corresponding individual gain. Transceiver 201 also includes a phase-shifter for each received signal so that the received signals can be phase-shifted individually as desired. For example, a phase-shifter 270 phase-shifts the amplified received signal $h_1$ from amplifier 271 according to a phase $\varphi_1$. Note that it is arbitrary as to what order the phase-shifting or gain is applied to a received signal. In an alternative implementation, a received signal may thus first be phase-shifted before being amplified. Similarly, a phase-shifter 272 phase-shifts the amplified received signal $h_4$ from amplifier 265 according to a phase $\varphi_4$. In this fashion, each received signal may be phase-shifted according to an individual phase shift.

Network device 200 is merely an example phase-retrieving network device as the phase retrieval disclosed herein may be practiced by any suitable network device in which a transceiver may individually adjust the gain and phase applied to the received signals from the network device's receive antenna array. Such a generic network device is denoted herein as a phase-retrieving network device. To begin a measurement of the relative phase between the receive antennas, a base station or other suitable network device (for example, a repeater or even another UE) transmits a series of reference signals to network device 200. It will be assumed that the source of the reference signals is a base station in the following discussion without loss of generality. Transceiver 201 includes a signal strength measurement circuit 285 for measuring a power of the amplified and phase-shifted received signals. For example, the power measurement may be a reference signal received power (RSRP). As part of the phase retrieval, the base station transmits a series of reference signals for an individual measurement of the signal power of each received signal. The resulting individual signal power measurements will now be discussed in more detail.

Individual Signal Power Measurement

Since there are $N_r$ received signals, the base station may thus transmit a series of $N_r$ reference signals for the individual signal power measurements of the received signals. The signal power is measured for the reference received signal and for each of the remaining ($N_r-1$) received signals. Each signal power measurement follows a respective reference signal transmission by the base station. The reference signals may be the same (equal to each other) across this series of reference signal transmissions. For example, the base station may transmit a first reference signal for the received signal power measurement of the received signal $h_1$ from first antenna 260. For this power measurement, transceiver 201 sets the gain for received signal $h_1$ to be 1 whereas the gains for the remaining received signals from receive antennas 261, 262, and 263 is set to zero. The setting of the gains may thus be deemed as selecting for the received signal $h_1$ from the plurality of received signals $h_1$ through $h_4$. Note that it does not matter what phase is applied to received signal $h_1$ as phase does not affect the power measurement of an individual received signal. Similarly, it doesn't matter what phase is applied to the remaining signals as the corresponding gains are all zero. Signal strength measurement circuit 285 may then proceed to measure an individual signal power equaling the absolute value squared ($|h_1|^2$) of received signal $h_1$.

The base station may then transmit a second reference signal following a successful measurement of signal power $|h_1|^2$ to characterize an individual signal power $|h_2|^2$ of received signal $h_2$. This second reference signal may be identical to the first reference signal used for the $|h_1|^2$ signal power measurement or may be different so long as it results in the same received signal power. The following discussion will assume that the same reference signal is transmitted for the signal power measurements. Transceiver 201 then sets the gain for all the received signals to be zero except for the second received signal $h_2$ which receives a gain of 1.

After signal strength measurement circuit 285 measures a signal power $|h_2|^2$ of the second received signal $h_2$, the base station may again transmit the reference signal so that transceiver 201 may measure a signal power $|h_3|^2$ of the third received signal $h_3$. The gain of the amplifier coupled to receive antenna 262 is set to one whereas all the remaining amplifiers have zero gain.

Finally, the base station may transmit the reference signal for a fourth time so that transceiver 201 may measure a signal power $|h_4|^2$ of the fourth received signal $h_4$. The gain of amplifier 265 is set to 1 whereas the gain of the remaining amplifiers is set to zero. The individual signal power measurements $|h_1|^2$ through $|h_4|^2$ are thus measured responsive to the reception of four corresponding reference signals.

More generally, a phase-retrieving network device may receive a sequential repetition of a reference signal so that $N_r$ individual signal power measurements may be performed to measure the power of each received signal from the $N_r$ receive antennas. The phase-retrieving UE will thus measure $N_r$ individual signal powers ranging from a first signal power $|h_1|^2$ to an $N_r$-th signal power $|hN_r|^2$. These $N_r$ signal power measurements are denoted as individual signal power measurements herein. The individual signal power measurements are not sufficient to complete a phase retrieval. Since an absolute phase measurement is not necessary, a phase-retrieving network device may then proceed to characterize the relative phases between the reference received signal and each of the received signals from the remaining ($N_r-1$) receive antennas.

A relative phase thus involves both the reference received signal and whatever received signal is being characterized from the remaining ($N_r-1$) receive antennas. This received signal from the remaining ($N_r-1$) receive antennas is denoted herein as an i-th received signal for generality. There is thus a pair of received signal involved in a relative phase measurement: the reference received signal and the i-th received signal. A power measurement for determining the relative phase may be denoted as a dual signal power measurement since it involves both the reference received signal and the i-th received signal. More generally, the relative phase measurement may also include additional received signals from the remaining ($N_r-1$) receive antennas such that a dual signal power measurement is a specific example of a multiple signal power measurement involving the reference received signal from the reference receive antenna and one or more received signals from the remaining ($N_r-1$) receive antennas. Some example multiple signal power measurements to complete the phase retrieval will now be discussed in more detail.

Multiple Signal Power Measurements

A multiple signal power measurement involves a power measurement upon a set of received signals selected from the plurality of received signals. If the set of received signals is just two received signals, the resulting power measurement may also be denoted as a dual signal power measurement. Dual signal power measurements will be described first followed by a discussion of multiple signal power measurements in which the set of received signal includes more than two received signals. Referring again to network device 200, first receive antenna 260 may be deemed to be the reference receive antenna, but any of the receive antennas may serve as the reference receive antenna. The set of ($N_r-1$) receive antennas for dual signal power measurements with respect to the reference receive antenna 260 is thus the second receive antenna 261, the third receive antenna 262, and the fourth receive antenna 263. Network device 200 may characterize the relative phase between the reference received signal $h_1$ and any one of the remaining received signals $h_2$, $h_3$, and $h_4$ using what is denoted herein as a dual signal power measurement since it involves a unit gain applied not only to the reference received signal $h_1$ but also to the i-th received signal (one of received signals $h_2$, $h_3$, and $h_4$). The characterization of the relative phase between the reference received signal and the i-th received signal may be performed using a first dual signal power measurement and a second dual signal power measurement. The base station will thus transmit a first reference signal for the first dual signal power measurement and then a second reference signal for the second dual signal power measurement. As noted earlier for the individual signal power measurements, the same reference signal may be re-transmitted for the various dual signal power measurements.

Received signal $h_4$ is selected as the i-th received signal in the following discussion but analogous dual signal measurements will apply to each of the remaining received signals $h_2$ and $h_3$ in conjunction with the reference received signal $h_1$. In the first dual signal power measurement, transceiver 201 may apply a unit gain both to the reference received signal $h_1$ from the first receive antenna 260 (which is deemed to be the reference antenna in this example) and to the received signal $h_4$ from the fourth receive antenna 263. Transceiver 201 applies zero phase to these two received signals and applies a zero gain to all the remaining received signals (it again does not matter what phase is applied to the zero-gain received signals). Reference received signal $h_1$ thus passes unchanged through amplifier 271 due to the unit gain and unchanged through phase-shifter 270 due to the zero-phase shift. Similarly, received signal $h_4$ passes unchanged through amplifier 265 and phase-shifter 272 due to the unit gain and zero phase shift. Signal strength measurement circuit 285 then measures a power $|h_1+h_4|^2$ of the sum of the reference received signal $h_1$ and received signal $h_4$. It can be shown that this first dual signal power measurement is equal to the sum of $|h_1|^2+|h_4|^2+2|h_1||h_4|\cos(\angle h_4-\angle h_1)$, where (($\angle h_4-\angle h_1$) is the relative phase angle between the reference received signal $h_1$ and received signal $h_4$.

For the second dual signal power measurement, transceiver 201 may again apply a unit gain to both the reference received signal $h_1$ and to the received signal $h_4$. The remaining received signals $h_2$ and $h_3$ each receive a zero gain and are thus blocked from affecting the measurement. Amplifiers 271 and 265 both apply a unit gain in the second dual signal power measurement. A zero-phase shift is again applied to reference received signal $h_1$, but a 90-degree phase shift is applied to received signal $h_4$. Phase-shifter 270 thus applies a zero phase shift to reference received signal $h_1$ whereas phase-shifter 272 phase shifts received signal $h_4$ by 90 degrees. It can be shown that the resulting second dual signal power measurement by signal strength measurement circuit 285 is equal to the sum of $|h_1|^2+|h_4|^2+2|h_1||h_4|\sin(\angle h_4-\angle h_1)$.

Given the first and second dual signal power measurements for received signals $h_1$ and $h_4$ as well as their individual signal power measurements, a suitable calculation engine in network device 200 such as processor 204 may proceed to solve for the relative phase difference ($\angle h_4-\angle h_1$) using a variety of trigonometric functions. For example, since the sum of $|h_1|^2+|h_4|^2$ is known from the individual signal power measurements, this sum may be subtracted from the first dual signal power measurement to provide an intermediate result M1 equaling $2|h_1||h_4|\cos(\angle h_4-\angle h_1)$. The same subtraction may be performed on the second dual signal power measurement to provide an intermediate result M2 equaling $2|h_1||h_4|\sin(\angle h_4-\angle h_1)$. A ratio of M1/M2 thus equals the tan ($\angle h_4-\angle h_1$) such that the relative phase ($\angle h_4-\angle h_1$) equals the arctangent of (M1/M2). It will be appreciated that numerous other trigonometric solutions may be used to obtain the relative phase ($\angle h_4-\angle h_1$) from the first and second dual signal power measurements. Analogous dual signal power measurements may be performed to obtain the remaining signal phases ($\angle h_2-\angle h_1$) and ($\angle h_3-\angle h_1$) for network device 200.

More generally, a phase-retrieving UE with $N_r$ receive antennas may perform $N_r$ individual signal power measurements to measure the power of each of its received signals h1 through h$N_r$. Measuring each relative phase between the reference received signal from the reference receive antenna and the received signals from the remaining (Nr−1) receive antennas uses two dual signal power measurements for each relative phase. There are thus $N_r$ individual signal power measurements and $2*(N_r-1)$ dual signal power measurements. The total number of signal power measurements is thus a sum of $N_r+2*(N_r-1)$. The sum of $N_r+2*(N_r-1)$ may be restated as a total of $3N_r-2$ power measurements. The phase retrieval may thus be completed following a serial transmission of $3N_r-2$ reference signals and the same number of power measurements.

Referring again to network device 200, transceiver 201 would thus adjust the gains and phase shifts accordingly for four individual signal power measurements and six dual signal power measurements to measure its three relative phases between its reference received signal and the three remaining received signals. Assuming that received signal $h_1$ is the reference received signal, there would be two dual signal power measurements involving reference received signal $h_1$ and received signal $h_2$, two dual signal power measurements involving reference received signal $h_1$ and received signal $h_3$, and two dual signal power measurements involving reference received signal $h_1$ and received signal $h_4$.

Various enhancements or modifications may be made to the phase retrieval scheme discussed herein. For example, each individual signal power measurement uses just one receive antenna from the receive antenna array. Similarly, each dual signal power measurement uses just two receive antennas from the receive antenna array. The limited number of active receive antennas for the resulting power measurements may then result in an insufficient signal-to-noise ratio, particularly in weak signal environments. To increase the received signal power, network device 200 may perform each of the $3N_r-2$ power measurements as a multiple signal power measurement of more than two received signals. Each individual received signal weight is chosen from the set of $\{1, -1, i, \text{ and } -i\}$, where i represents a phase shift of 90 degrees and -i represents a phase shift of -90 degrees. Network device 200 may then recover the received signal phase estimates using more complex phase retrieval operations. Although the signal-to-noise for the power measurements may thus be boosted by using two or more received signals in addition to the reference received signal, this power boost comes at the cost of increased complexity for the resulting phase retrieval calculations. Network device 200 may thus be configured by a base station or other suitable network node to adapt its phase retrieval algorithm based upon received signal quality estimates. Alternatively, network device 200 may itself adapt its phase retrieval algorithm based upon received signal quality estimates. If the signal-to-noise of the individual received signals is sufficient, network device 200 may utilize the individual signal power measurement and dual signal power measurement technique discussed herein. However, if the signal quality is below a threshold value, network device 200 may instead be configured to use a more complex phase retrieval operation. Note that the $3N_r-2$ is the minimum number of power measurements necessary to perform an indirect phase measurement of the relative phase between the reference received signal and each of the remaining $(N_r-1)$ received signals. Should network device 200 be located in a weak signal environment and/or in noisy conditions, more than $3N_r-2$ power measurements may be used. Since each power measurement requires a corresponding reference signal transmission from the base station, increasing the number of power measurements also increases the delay necessary to complete the power measurements. The number of power measurements used may thus be based on a tradeoff between the delay and the received signal quality.

Direct Phase Measurement

Transceiver 201 may be configured to perform a direct phase measurement on one or more of its received signals. Although a direct phase measurement requires more transceiver complexity, a direct phase measurement may be performed based upon the reception of just a single reference signal. In contrast, a phase retrieval using signal strength proxies as described herein (which may be denoted as an indirect phase measurement) requires the reception of at least three reference signals. A direct phase measurement may thus be performed more quickly as compared to an indirect phase measurement. The decision to perform direct vs indirect phase measurements may be made on a subset-by-subset basis from the plurality of receive antennas. One subset of receive antennas may have its phase characterized indirectly using signal strength proxies whereas network device 200 directly measures the phase of another subset of receive antennas. Each subset may be defined on an antenna module or antenna panel basis. The decision to perform a direct or indirect phase characterization on any given receive antenna or subset of receive antennas may be static or may be dynamic such as based upon the received signal power, thermal overhead, Doppler shift or speed associated with network device 200, a rate of change in channel structure, data rate requirements, and other suitable factors. The decision to perform either a direct or indirect phase measurement may be made by network device 200 or by another network device such as the base station. For example, if a given subset of antennas has a lower received signal power and/or a lower thermal overhead, the UE may choose to or be commanded to use a direct phase measurement. In contrast, the UE may choose to or be commanded to use an indirect phase measurement on antennas having higher received signal power and/or a greater thermal overhead.

Reference Signals for Indirect Phase Measurements

Figure 3:
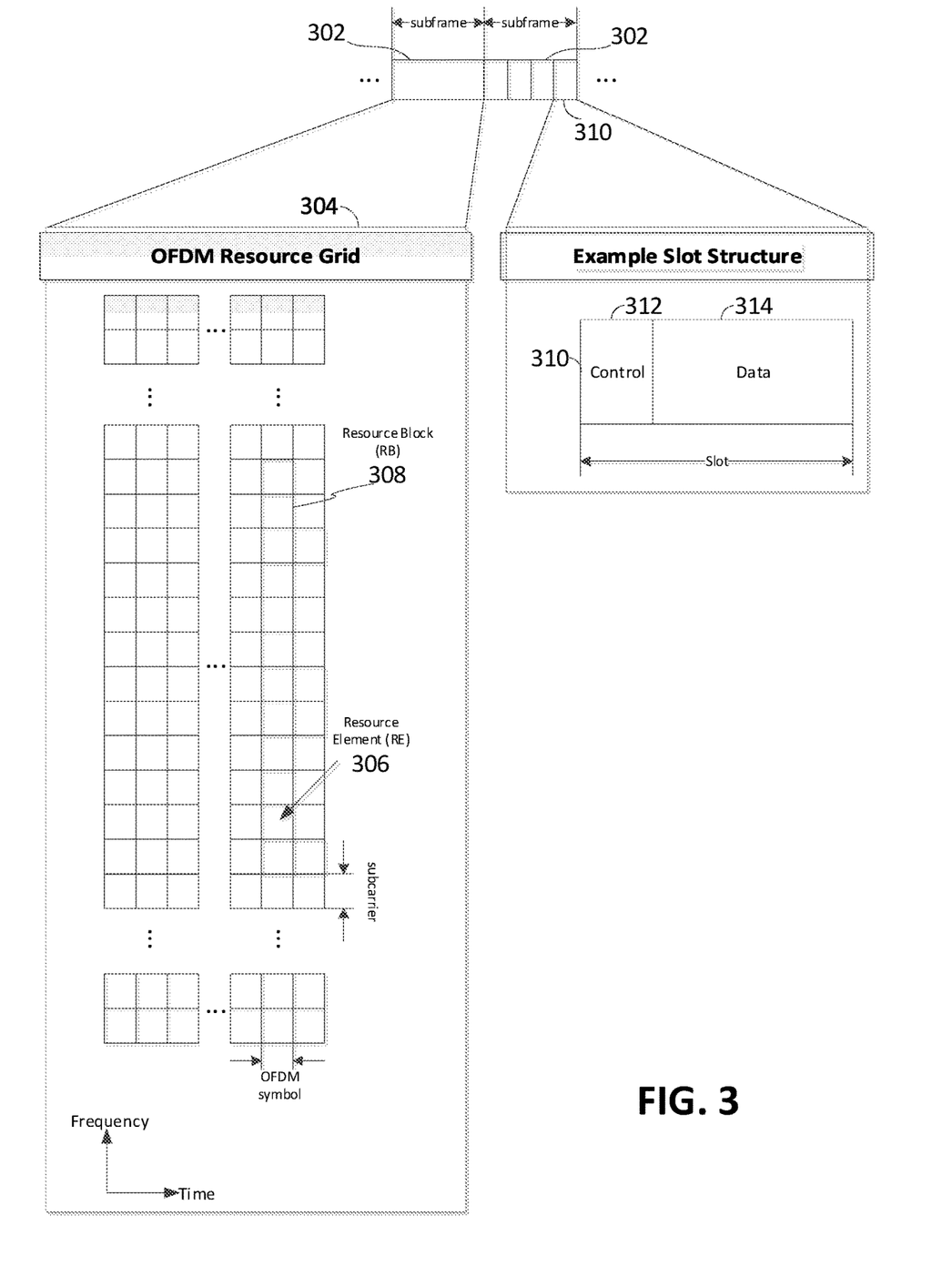
FIG. 3 is a schematic illustration of an organization of wireless resources utilizing orthogonal frequency divisional multiplexing (OFDM) for the network device of FIG. 2.

Several types of reference signals may be transmitted by the base station for the indirect phase measurements. These reference signals may also be denoted as training symbols for the indirect phase measurements. To provide a better appreciation of the reference signals, a review of a time-frequency resource grid for the reference signal transmission as defined with respect to an orthogonal frequency-division multiplexing (OFDM) waveform will now be discussed. An example time-frequency resource grid 304 is illustrated in FIG. 3. In one implementation, a frame refers to a duration of 10 ms for wireless transmissions, with each frame consisting of 10 subframes of 1 ms each. On a given carrier, there may be one set of frames in the UL, and another set of frames in the DL. An expanded view of an exemplary DL subframe 302 is also shown in FIG. 3. However, as those skilled in the art will readily appreciate, the PHY transmission structure for any particular application may vary from the example described here, depending on any number of factors. In resource grid 304, time is in the horizontal direction with units of OFDM symbols and frequency is in the vertical direction with units of subcarriers or tones.

The resource grid 304 may be used to schematically represent time-frequency resources for a given antenna port. For example, in a MIMO implementation with multiple antenna ports, a corresponding multiple number of resource grids 304 may be available for communication on the various antenna ports. The resource grid 304 is divided into multiple resource elements (REs) 306. A resource element 306, which is 1 subcarrier×1 symbol, is the smallest discrete part of the time-frequency grid, and contains a single complex value representing data from a physical channel or signal. A block of twelve consecutive subcarriers defined a resource block (RB) 308, which has an undefined time duration in the NR standard. In FIG. 3, resource block 308 extends over a symbol duration. A set of contiguous RBs 308 form a bandwidth part (BWP).

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14

OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of a slot 310 includes a control region 312 and a data region 314. In general, the control region 312 may carry control channels (e.g., the physical downlink control channel (PDCCH)), and the data region 314 may carry data channels (e.g., the physical downlink shared channel (PDSCH) or the physical uplink shared channel (PUSCH)). Each slot 310 may contain all DL, all UL, or at least one DL portion and at least one UL portion. The structure illustrated in FIG. 3 is merely exemplary in nature, and different slot structures may be utilized, and may include one or more of each of the control region(s) and data region(s).

The various REs 306 within an RB 308 may be scheduled to carry one or more physical channels, including control channels, shared channels, data channels, etc. Other REs 306 within the RB 308 may also carry pilots or reference signals, including but not limited to a demodulation reference signal (DMRS), or cell specific reference signal (CRS). These pilots or reference signals may be used by a receiving device to perform channel estimation of the corresponding channel, which may enable coherent demodulation/detection of the control and/or data channels within the RB 308. Some example reference signals for the phase retrieval will now be discussed in more detail in light of this time-frequency resource grid background discussion.

In one implementation for the reference signal transmission, the base station may transmit a series of channel-state-information reference signals (CSI-RSs) as the reference signals for the phase retrieval. Each CSI-RS may comprise a single (or multiple) resource element 306 in contiguous resource blocks 308 within one or more slots 310. Alternatively, the reference signal transmission may comprise a series of synchronization signal blocks (SSBs).

Figure 4:
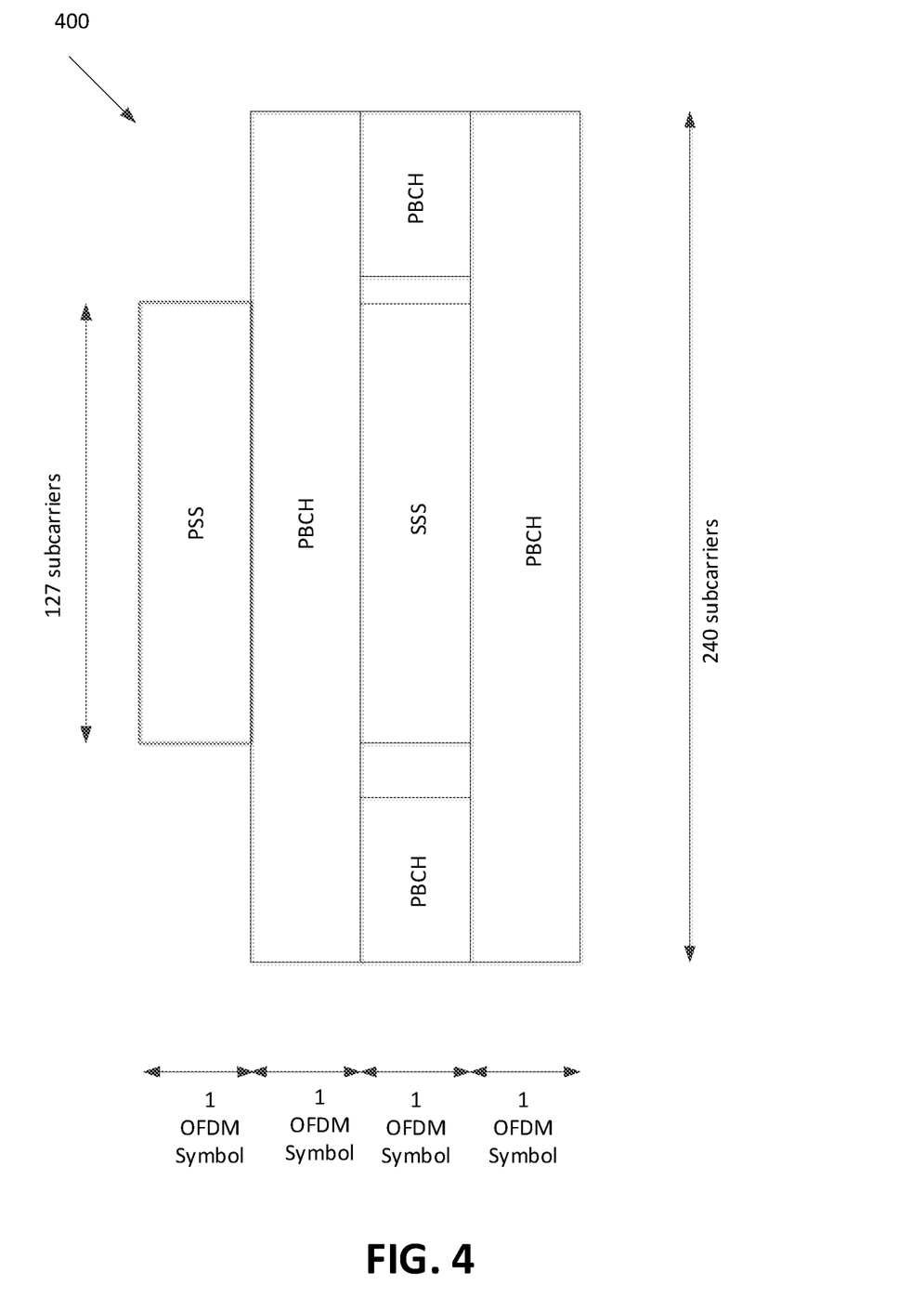
FIG. 4 illustrates a synchronization signal block (SSB) for use as a reference signal I the phase retrieval performed in the network device of FIG. 2.

An example SSB 400 for use as a reference signal is shown in FIG. 4. SSB 400 extends over four OFDM symbols. The available bandwidth for SSB 400 is 240 subcarriers, which is 20 resource blocks. The first OFDM symbol may include a primary synchronization signal (PSS) that extends across 127 subcarriers within the center of the available bandwidth. A physical broadcast channel (PBCH) occupies all 240 subcarriers in the second OFDM symbol. A secondary synchronization signal (SSS) occupies the center 127 subcarriers within the third OFDM signal. If the 240-subcarrier bandwidth for SSB 200 is deemed to extend from a first resource block to a twentieth resource block, the PBCH occupies the first 4 resource blocks and the final four resource blocks in the third OFDM symbol. The PBCH also occupies all 240 subcarriers in the fourth OFDM symbol. The PBCH provides system information including a master information block (MIB). The MIB configures a zeroth control resource set (CORESET) that is a set of time and frequency resources within which a UE decodes candidate control channels. The network device may then acquire a first system information block (SIB1) to acquires its initial (default) UL and DL bandwidth parts (BWPs). These initial BWPs are denoted with an index zero. With the UE transitioning to a connected mode, the network device may then be configured through a radio resource control (RRC) configuration to use a new UL BWP and/or a new DL BWP having a non-zero index.

Prior to the phase retrieval, the network device may transmit its phase retrieval capability to a network entity such as a base station. The phase retrieval capability may identify receive antennas and/or receive antenna sub-arrays for which the network device is able to directly measure phase. Similarly, the phase retrieval capability may identify receive antennas and/or receive antenna sub-arrays for which the network device is able to measure relative phase using the signal strength proxies discussed herein. This phase retrieval capability may be dynamic such that it changes over time such as by being dependent on the received signal strength, thermal overhead, Doppler and/or velocity associated with the network device, a rate for which the channel structure changes, rate requirements, and so on.

The phase retrieval capability transmitted from the network device to the network may also include a request for a specific number of reference signals to be transmitted to the network device so that a sufficient number of signal strength proxies may be measured to indirectly characterize the received signal phases (for those received signals that are not being directly measured). The requested number of reference signals may be associated with a certain periodicity. This periodicity may depend upon the rate of change for the associated channels and the link margin. Alternatively, the periodicity of the reference signals may be determined by the network such as at the gNB based on an estimated rate of side channel change such as determined through sounding reference signals (SRS).

With the network device having reported its phase retrieval capability to the network, a suitable network entity such as a base station may then proceed to transmit the reference signals. For example, the base station may transmit a series of CSI-RSs in contiguous RBs within one or a few slots. Alternatively, the base station may transmit SSBs spread over time. The network entity may then receive the series of reference signals using an appropriate set of receive beams. With the phase retrieval completed so that the relative phase relationship between the received signals is characterized, the network entity may then appropriately adjust the phase shifters for the received signals so that coherent beamforming is achieved.

Based upon the phase retrieval results, the network device may then report a measure of the quality of the phase retrieval. For example, the network device may base the quality upon the SNR realized in estimating the phases such as based on the sampling beam weights and the number of reference signals configured for the phase estimation. Based upon the measured quality, the gNB (base station) may continue with its existing reference signal periodicity or increase the periodicity to for an improved phase estimate. For example, the gNB may increase the rate of a periodic reference signal transmission depending upon the measured quality by the UE and the UE's capability (such as the capability to perform direct phase measurements as opposed to the phase retrieval discussed herein). The quality reported by the UE may be based upon at least one of an SNR, a reference signal received power (RSRP), a signal to interference and noise ratio (SINR), or any other suitable measurement. Should the quality reported by the UE be below a first threshold value, the gNB may increase the serial transmission rate of the reference signals. Conversely, should the quality reported by the UE be above a second threshold that is greater than the first threshold, the gNB may decrease the serial transmission rate of the reference signals.

Figure 5:
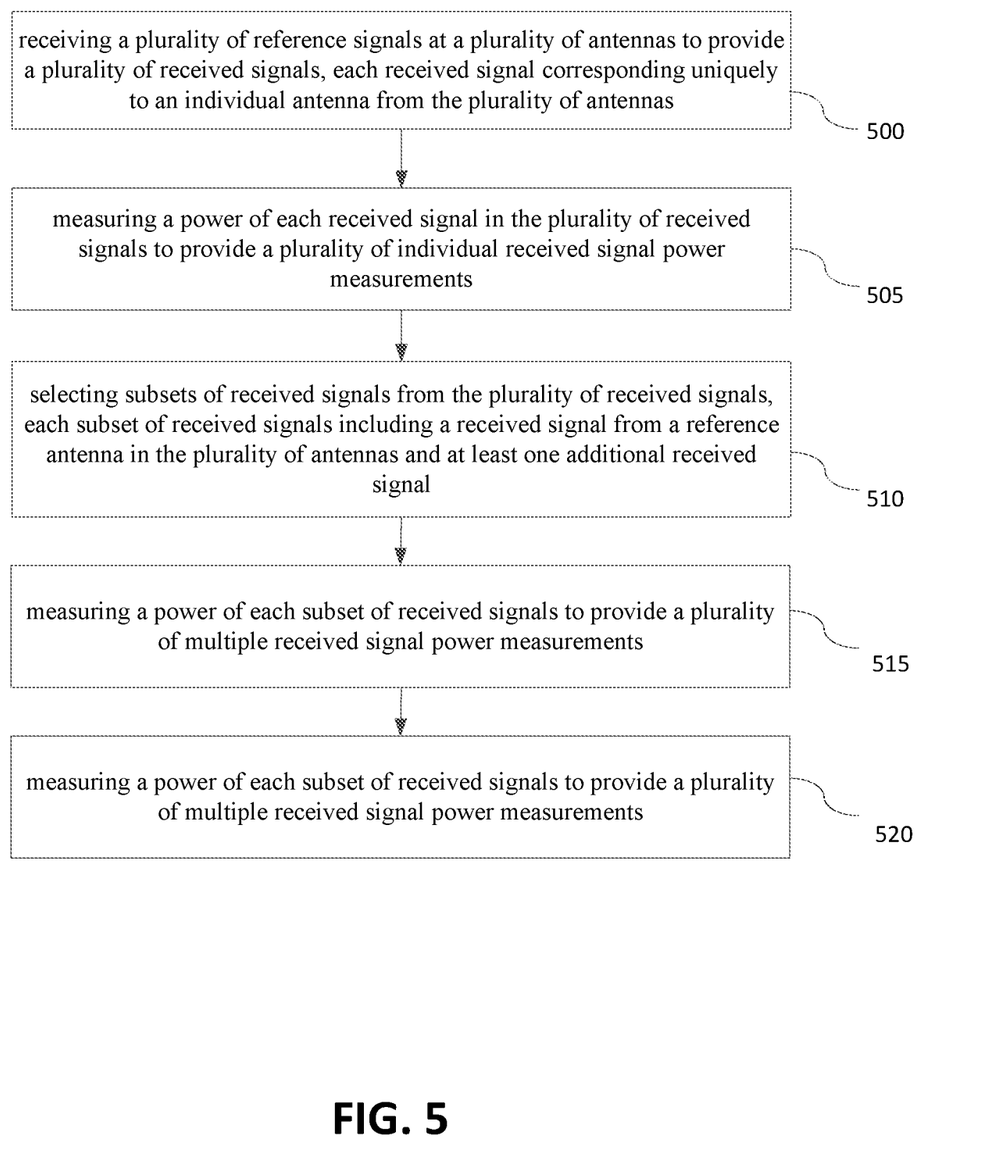
FIG. 5 is a flowchart for an example method of phase retrieval using signal strength proxies in accordance with an aspect of the disclosure.

An example method of phase retrieval using power measurement will now be discussed with regard to the flowchart of FIG. 5. The method includes an act 500 of receiving a plurality of reference signals at a plurality of antennas to provide a plurality of received signals, each received signal corresponding uniquely to an individual antenna from the plurality of antennas. The receiving of received signal $h_1$ through $h_4$ discussed with regard to FIG. 2 is an example of act 500. The method also includes an act 505 of measuring a power of each received signal in the plurality of received signals to provide a plurality of individual received signal power measurements. The measuring to provide the individual received signal power measurements $|h_1|^2$ through $|h_4|^2$ as discussed with regard to FIG. 2 is an example of act 505. The method further includes an act 510 of selecting subsets of received signals from the plurality of received signals, each subset of received signals including a received signal from a reference antenna in the plurality of antennas and at least one additional received signal. The selection of the received signals for each multiple signal power measurement such as selecting received signals $h_1$ and $h_2$, or received signals $h_1$ and $h_3$, or received signals $h_1$ and $h_4$ as discussed with regard to FIG. 2 is an example of act 510. In addition, the method includes an act 515 of measuring a power of each subset of received signals to provide a plurality of multiple received signal power measurements. The dual signal power measurement discussed with regard to FIG. 2 is an example of act 515. Finally, the method includes an act 520 of determining a relative phase between the received signal from the reference antenna and each remaining received signal in the plurality of received signals based upon the plurality of individual received signal power measurements and the plurality of multiple received signal power measurements. The relative phase determinations discussed with regard to FIG. 2 is an example of act 520.

The disclosure will now be summarized with the following series of example clauses:

Clause 1. A network device, comprising:
a transceiver including a plurality of antennas, the transceiver being configured to:
process a plurality of received signals from the plurality of antennas to provide a series of individual received signals, each individual received signal being derived from a received signal from a respective antenna in the plurality of antennas,
process the plurality of received signals to provide a series of sets of received signals, each set of received signals being derived from at least two corresponding received signals from respective antennas in the plurality of antennas, and
measure a power of each individual received signal in the series of individual received signals and of each set of received signals in the series of sets of received signals to provide a plurality of power measurements, the network device further comprising:
a processor configured to process the plurality of power measurements to determine a relative phase between the received signal from a reference antenna in the plurality of antennas and the received signal from each antenna in the plurality of antennas except the reference antenna to provide a plurality of relative phase measurements.

Clause 2. The network device of clause 1, wherein the transceiver is further configured to measure the power of each individual received signal and the power of each set of received signals using a reference signal received power measurement.

Clause 3. The network device of clause 2, wherein the transceiver is further configured to perform the reference signal received power measurement on a plurality of received synchronization signal blocks to measure the power of each individual received signal and the power of each set of received signals.

Clause 4. The network device of clause 2, wherein the transceiver is further configured to perform the reference signal received power measurement on a plurality of received channel state information reference signals to measure the power of each individual received signal and the power of each set of received signals.

Clause 5. The network device of any of clauses 1-4, wherein the transceiver is further configured to process the plurality of received signals to provide the series of sets of received signals so that each set of received signals includes the received signal from the reference antenna.

Clause 6. The network device of clause 5, wherein the transceiver is further configured to process each set of received signals so that each set of received signals includes the received signal from the reference antenna and one additional received signal.

Clause 7. The network device of clause 6, wherein each set of received signals comprises a first pair of received signals and a second pair of received signals, and wherein the transceiver is further configured to apply a zero degree phase shift to the received signal from the reference antenna and to the additional received signals in the first pair of received signals and to apply a zero degree phase shift to the received signal from the reference antenna and a ninety degree phase shift to the additional received signal in the second pair of received signals.

Clause 8. The network device of clause 7, wherein the processor is further configured to use a trigonometric function to determine the relative phase between the received signal from the reference antenna and the received signal from each antenna in the plurality of antennas except the reference antenna.

Clause 9. The network device of any of clauses 1-8, wherein the transceiver is further configured so that each set of received signals includes more than two received signals.

Clause 10. The network device of any of clauses 1-9, wherein the transceiver is further configured to beamform based upon the plurality of relative phase measurements.

Clause 11. The network device of any of clauses 1-10, wherein the transceiver is further configured to perform a direct phase measurement on the received signal from each antenna in a subset of antennas from the plurality of antennas.

Clause 12. The network device of clause 11, wherein the network device is a first network device and wherein the processor is further configured to select the subset of antennas based upon a command from a second network device.

Clause 13. The network device of clause 11, wherein the processor is further configured to select the subset of antennas based upon at least one of the power of each individual received signal in the series of individual received signals and of each set of received signals in the series of sets of received signals, a thermal overhead of the network device, a Doppler shift or speed associated with the network device, a rate of change in channel structure, and a data rate requirement.

Clause 14. The network device of any of clauses 1-13, wherein the network device is a first network device and wherein the transceiver is further configured to transmit a report regarding a quality of the plurality of relative phase measurements to second network device.

Clause 15. The network device of clause 14, wherein the first network device is a user equipment and the second network device is a base station.

Clause 16. A first network device, comprising:

a transceiver including a plurality of antennas, and a processor configured to command the transceiver to transmit a series of reference signals according to a periodicity to a second network device for a series of relative phase measurements at the second network device.

Clause 17. The first network device of clause 16, wherein the processor is further configured to change the periodicity based upon at least one of a channel rate change report received from the second network device and a link margin.

Clause 18. The first network device of clause 17, wherein the transceiver is configured to transmit a command to the second network device to indicate which antennas in the second network device should be characterized by the series of relative phase measurements.

Clause 19. The first network device of clause 18, wherein the transceiver is further configured to transmit the command based upon at least one of a received signal power at the second network device, a speed of the second network device or a Doppler shift at the second network device, and a data rate requirement at the second network device.

Clause 20. The first network device of any of clauses 16-19, wherein the first network device is a base station.

Clause 21. A method of phase retrieval, comprising:

receiving a plurality of reference signals at a plurality of antennas to provide a plurality of received signals, each received signal corresponding uniquely to an individual antenna from the plurality of antennas;

measuring a power of each received signal in the plurality of received signals to provide a plurality of individual received signal power measurements;

selecting subsets of received signals from the plurality of received signals, each subset of received signals including a received signal from a reference antenna in the plurality of antennas and at least one additional received signal;

measuring a power of each subset of received signals to provide a plurality of multiple received signal power measurements; and determining a relative phase between the received signal from the reference antenna and each remaining received signal in the plurality of received signals based upon the plurality of individual received signal power measurements and the plurality of multiple received signal power measurements.

Clause 22. The method of clause 21, further comprising:

selectively phase-shifting each at least one additional received signal with a phase shift of zero degrees or of ninety degrees.

Clause 23. The method of clause 22, wherein each at least one additional received signal is a single received signal and wherein each multiple received signal power measurement is a dual received signal power measurement, and wherein selectively phase-shifting the single received signal comprises:

applying a phase shift of zero degrees for a first dual received signal power measurement; and applying a phase shift of ninety degrees for a second dual received signal power measurement.

Clause 24. The method of clause 21, wherein determining each relative phase uses a trigonometric function.

Clause 25. The method of clause 24, wherein the trigonometric function is an arctangent function.

Clause 26. The method of any of clauses 21-25, further comprising:

measuring a signal-to-noise ratio for the plurality of received signals; and transmitting an indication of the signal-to-noise ratio to a remote network device.

Clause 27. A network device, comprising:

a transceiver including a plurality of antennas configured to provide a plurality of received signals, the transceiver being configured to:

process a received signal from a selected antenna from the plurality of antennas or received signals from a selected subset of antennas from the plurality of antennas to provide a series of received signals, and measure a power of each received signal in the series of received signals to provide a plurality of power measurements, the network device further comprising:

a processor configured to process the plurality of power measurements to determine a relative phase between the received signal from a reference antenna in the plurality of antennas and the received signal from each antenna in the plurality of antennas except the reference antenna.

Clause 28. The network device of clause 27, wherein the transceiver further includes a plurality of amplifiers corresponding to the plurality of received signals, and wherein the transceiver is further configured to:

control the plurality of amplifiers to process the received signal from the selected antenna by an application of a positive gain to the received signal from the selected antenna and by an application of a zero gain to the received signal from each antenna in the plurality of antennas except the selected antenna; and control the plurality of amplifiers to process the received signals from the selected subset of antennas by an application of a positive gain to the received signal from each antenna in the selected subset of antennas and by an application of a zero gain to the received signal from each antenna in the plurality of antennas except the selected subset of antennas.

Clause 29. The network device of clause 28, wherein the transceiver further includes a plurality of phase-shifters corresponding to the plurality of antennas, and wherein the transceiver is further configured to control the plurality of phase-shifters to apply either a zero-degree phase shift or a ninety-degree phase shift to each received signal from the selected subset of antennas.

Clause 30. The network device of any of clauses 27-29, wherein the transceiver is further configured to process a series of received signal synchronization blocks to form the series of received signals.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

What is claimed is:

1. A network device, comprising:
a transceiver including a plurality of antennas, the transceiver being configured to:
process a plurality of received signals from the plurality of antennas to provide a series of individual received signals, each individual received signal being derived from a received signal from a respective antenna in the plurality of antennas,
process the plurality of received signals to provide a series of sets of received signals, each set of received signals being derived from at least two corresponding received signals from respective antennas in the plurality of antennas, and
measure a power of each individual received signal in the series of individual received signals and of each set of received signals in the series of sets of received signals to provide a plurality of power measurements, the network device further comprising:
one or more processors configured to process the plurality of power measurements to determine a relative phase between the received signal from a reference antenna in the plurality of antennas and the received signal from each antenna in the plurality of antennas except the reference antenna to provide a plurality of relative phase measurements.

2. The network device of claim 1, wherein the transceiver is further configured to measure the power of each individual received signal and the power of each set of received signals using a reference signal received power measurement.

3. The network device of claim 2, wherein the transceiver is further configured to perform the reference signal received power measurement on a plurality of received synchronization signal blocks to measure the power of each individual received signal and the power of each set of received signals.

4. The network device of claim 2, wherein the transceiver is further configured to perform the reference signal received power measurement on a plurality of received channel state information reference signals to measure the power of each individual received signal and the power of each set of received signals.

5. The network device of claim 1, wherein the transceiver is further configured to process the plurality of received signals to provide the series of sets of received signals so that each set of received signals includes the received signal from the reference antenna.

6. The network device of claim 5, wherein the transceiver is further configured to process each set of received signals so that each set of received signals includes the received signal from the reference antenna and one additional received signal.

7. The network device of claim 6, wherein each set of received signals comprises a first pair of received signals and a second pair of received signals, and wherein the transceiver is further configured to apply a zero degree phase shift to the received signal from the reference antenna and to the additional received signals in the first pair of received signals and to apply a zero degree phase shift to the received signal from the reference antenna and a ninety degree phase shift to the additional received signal in the second pair of received signals.

8. The network device of claim 7, wherein the one or more processors are further configured to use a trigonometric function to determine the relative phase between the received signal from the reference antenna and the received signal from each antenna in the plurality of antennas except the reference antenna.

9. The network device of claim 1, wherein the transceiver is further configured so that each set of received signals includes more than two received signals.

10. The network device of claim 1, wherein the transceiver is further configured to beamform based upon the plurality of relative phase measurements.

11. The network device of claim 1, wherein the transceiver is further configured to perform a direct phase measurement on the received signal from each antenna in a subset of antennas from the plurality of antennas.

12. The network device of claim 11, wherein the network device is a first network device and wherein the one or more processors are further configured to select the subset of antennas based upon a command from a second network device.

13. The network device of claim 11, wherein the one or more processors are further configured to select the subset of antennas based upon at least one of the power of each individual received signal in the series of individual received signals and of each set of received signals in the series of sets of received signals, a thermal overhead of the network device, a Doppler shift or speed associated with the network device, a rate of change in channel structure, and a data rate requirement.

14. The network device of claim 1, wherein the network device is a first network device and wherein the transceiver is further configured to transmit a report regarding a quality of the plurality of relative phase measurements to second network device.

15. The network device of claim 14, wherein the first network device is a user equipment and the second network device is a base station.

16. A first network device, comprising:
a transceiver including a plurality of antennas, and
one or more processors configured to;
command the transceiver to transmit a series of reference signals according to a periodicity to a second network device for a series of relative phase measurements at the second network device; and
change the periodicity based upon at least one of a channel rate change report received from the second network device and a link margin.

17. The first network device of claim 16, wherein the transceiver is configured to transmit a command to the second network device to indicate which antennas in the second network device should be characterized by the series of relative phase measurements.

18. The first network device of claim 17, wherein the transceiver is further configured to transmit the command based upon at least one of a received signal power at the second network device, a speed of the second network device or a Doppler shift at the second network device, and a data rate requirement at the second network device.

19. The first network device of claim 16, wherein the first network device is a base station.

20. A method of phase retrieval, comprising:
receiving a plurality of reference signals at a plurality of antennas to provide a plurality of received signals, each received signal corresponding uniquely to an individual antenna from the plurality of antennas;
measuring a power of each received signal in the plurality of received signals to provide a plurality of individual received signal power measurements;

selecting subsets of received signals from the plurality of received signals, each subset of received signals including a received signal from a reference antenna in the plurality of antennas and at least one additional received signal;

measuring a power of each subset of received signals to provide a plurality of multiple received signal power measurements; and determining a relative phase between the received signal from the reference antenna and each remaining received signal in the plurality of received signals based upon the plurality of individual received signal power measurements and the plurality of multiple received signal power measurements.

21. The method of claim 20, further comprising:
selectively phase-shifting each at least one additional received signal with a phase shift of zero degrees or of ninety degrees.

22. The method of claim 21, wherein each at least one additional received signal is a single received signal and wherein each multiple received signal power measurement is a dual received signal power measurement, and wherein selectively phase-shifting the single received signal comprises:

applying a phase shift of zero degrees for a first dual received signal power measurement; and applying a phase shift of ninety degrees for a second dual received signal power measurement.

23. The method of claim 20, wherein determining the relative phase uses a trigonometric function.

24. The method of claim 23, wherein the trigonometric function is an arctangent function.

25. The method of claim 24, further comprising:
measuring a signal-to-noise ratio for the plurality of received signals; and transmitting an indication of the signal-to-noise ratio to a remote network device.

26. A network device, comprising:
a transceiver including a plurality of antennas configured to provide a plurality of received signals, the transceiver being configured to:

process a received signal from a selected antenna from the plurality of antennas or received signals from a selected subset of antennas from the plurality of antennas to provide a series of received signals, and measure a power of each received signal in the series of received signals to provide a plurality of power measurements, the network device further comprising:

one or more processors configured to process the plurality of power measurements to determine a relative phase between the received signal from a reference antenna in the plurality of antennas and the received signal from each antenna in the plurality of antennas except the reference antenna.

27. The network device of claim 26, wherein the transceiver further includes a plurality of amplifiers corresponding to the plurality of received signals, and wherein the transceiver is further configured to:

control the plurality of amplifiers to process the received signal from the selected antenna by an application of a positive gain to the received signal from the selected antenna and by an application of a zero gain to the received signal from each antenna in the plurality of antennas except the selected antenna; and control the plurality of amplifiers to process the received signals from the selected subset of antennas by an application of a positive gain to the received signal from each antenna in the selected subset of antennas and by an application of a zero gain to the received signal from each antenna in the plurality of antennas except the selected subset of antennas.

* * * * *